Figure 1:
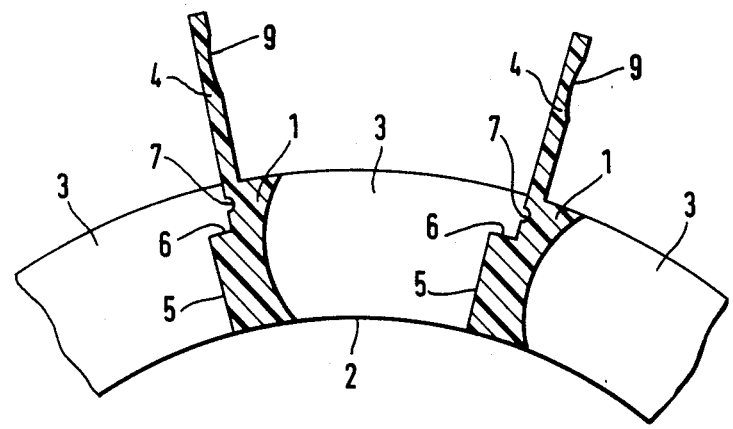

United States Patent [19]

Rabe

[11] Patent Number: 4,620,806
[45] Date of Patent: Nov. 4, 1986

[54] CAGE

[75] Inventor: Jürgen Rabe, Aurachtal, Fed. Rep. of Germany

[73] Assignee: INA Wälzlager Schaeffler KG, Herzogenaurach, Fed. Rep. of Germany

[21] Appl. No.: 755,296

[22] Filed: Jul. 15, 1985

[30] Foreign Application Priority Data

Jul. 25, 1984 [DE] Fed. Rep. of Germany ....... 3427347

[51] Int. Cl.$^4$ .................. F16C 33/46; F16C 33/56; F16D 15/00
[52] U.S. Cl. .................................. 384/572; 192/45; 384/576
[58] Field of Search .................... 384/572–580, 384/523–534; 192/45, 44

[56] References Cited

U.S. PATENT DOCUMENTS

| 3,184,020 | 5/1965 | Benson et al. | 192/45 |
| 3,260,333 | 7/1966 | Benson et al. | 192/45 |
| 3,863,742 | 2/1975 | Elmore et al. | 192/45 |
| 3,937,312 | 2/1976 | Gehrke | 192/45 |
| 3,993,176 | 11/1976 | Marola et al. | 384/577 X |
| 4,054,192 | 10/1977 | Johnson | 192/45 |
| 4,088,211 | 5/1978 | Doller et al. | 192/45 |
| 4,185,724 | 1/1980 | Kitchin | 192/45 |
| 4,187,937 | 2/1980 | Kitchin | 192/45 |

Primary Examiner—Stuart S. Levy
Assistant Examiner—Thomas R. Hannon
Attorney, Agent, or Firm—Bierman, Peroff and Muserlian

[57] ABSTRACT

A novel cage for an overrunning roller clutch the cage being made of polymeric material and having two end rings connected by crossbars for forming a plurality of pockets for cam rollers, the crossbars being provided with integrally molded leaf shaped spring elements acting on the cam rollers, each crossbar having on its outer diameter at least one spring element which in its initial state extends essentially in a plane containing the cage axis and which is bent essentially radially inwardly when the cam roller is inserted in the respective pocket.

6 Claims, 2 Drawing Figures

CAGE

STATE OF THE ART

DE-OS No. 1,625,744 describes a cage for an overrunning roller clutch produced as a band consisting of interconnected cage segments and bent into a circle in order to install the cage in the clutch. Since each segment of the said cage only accommodates one cam roller and since the segments can not be made randomly smaller because of the large circumferential space requirements of the springs, the said cage can only accommodate a limited number of cam rollers.

If the known cage is made in the form of a closed ring as required in many applications, a mold with slides acting radially from the outside and the inside is required and such a mold is very expensive. Moreover, it is not possible to produce small diameter cages due to the space requirements of the slidesacting from the inside.

OBJECTS OF THE INVENTION

It is an object of the invention to provide a roller cage which is capable of accommodating an increased number of cam rollers over its circumference and which can be produced with a small diameter and as a closed ring using an inexpensive mold.

This and other objects and advantages of the invention will become obvious from the following detailed description.

THE INVENTION

The novel cage of the invention for an overrunning roller clutch is made of polymeric material and has two end rings connected by crossbars for forming a plurality of pockets for cam rollers, the crossbars being provided with integrally molded leaf shaped spring elements acting on the cam rollers, each crossbar having on its outer diameter at least one spring element which in its initial state extends essentially in a plane containing the cage axis and which is bent essentially radially inwardly when the cam roller is inserted in the respective pocket. Due to the configuration of the spring element and its radial extent in its initial state, the cage can be molded as a closed ring in a mold which does not reguire slides acting from the inside which makes the production of small diameter cages possible. Since the cage crossbars with bent spring elements after insertion of the cam rollers require little space circumferentially, it is possible to accommodate relatively more cam rollers over the circumference of the cage.

To vary the spring constant, the spring element may also extend only over a part of the crossbar length. In addition, there is the possibility of applying spring pressure to both the cam roller ends separately by molding two spring elements to a crossbar. For better utilization of the available space in radial direction for as large a cross-sectional crossbar area as possible, the spring element may emanate from the outer crossbar edge adjacent to the pocket in which the spring element is active.

According to another embodiment of the invention, the lateral crossbar surface facing the pocket in which the spring element is active may have a recess in its entire radially outward area. By this means, the attachement point of the spring element is removed from the pocket by the depth of the recess, thereby obtaining a greater spring length. The radial extent of the recess should be designed so that the bent spring element can not make contact with the outer edge of the crossbar shoulder formed by the recess.

Another embodiment of the invention provides for the lateral crossbar surface adjacent to the spring element to have, in the area of the spring element, a groove extending in the axial direction which should extend at least over the entire width of the spring element as it serves to improve the elastic deformation behavior of the crossbar area at the attachement point of the spring element and to make it possible to bend the spring element by more than 90°.

According to a last variant of the invention, the spring element has an axial recess in its area in contact with the inserted cam roller, said recess being essentially of circular arc shape adapted to the cam roller radius. The purpose of this recess is to improve the retention of the cam roller in the pocket.

Figure 2:
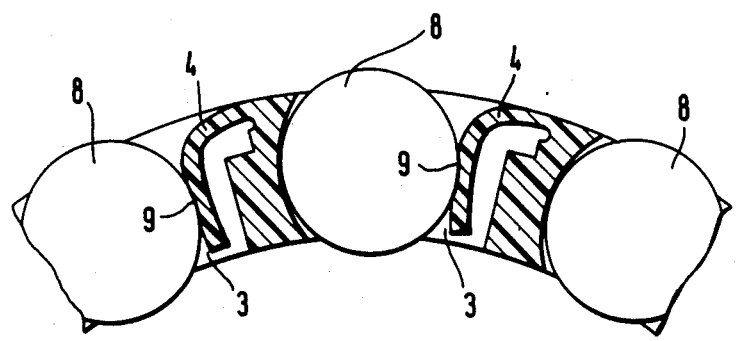

Referring now to the drawings:

FIG. 1 is a partial transverse cross-section of a sector of a cage embodiment of the invention in its initial state and FIG. 2 is a similar view of the same sector after insertion of the cam roller.

In the cage of FIG. 1, the cross-bars 1 and end rings 2 delimit pockets 3 which receive the cam rollers and each crossbar 1 has at its one outer edge at least one spring element 4 oriented radially outward. The lateral crossbar surface 5 has in its radially outer area a recess 6 and the latter, in its surface adjacent to the spring element 4 is provided with groove 7. Recess 6 serves for extending the attainable spring length and groove 7 improves the bending behavior of the spring element 4 at its attachement point. In addition, in its area in contact with the inserted cam roller 8, spring element 4 has, as can be seen from FIG. 2, an axial recess 9 of circular arc shape adapted to the radius of cam roller 8 to improve the retention of cam roller 8 in pocket 3.

Various modifications of the cage of the invention may be made without departing from the spirit or scope thereof and it is to be understood that the invention is intended to be limited only as defined in the appended claims.

What I claimed is:

1. A cage for an overrunning roller clutch, the cage being made of polymeric material and having two end rings connected by crossbars for forming a plurality of pockets for cam rollers, the crossbars being provided on their length with integrally molded leaf shaped spring elements acting on the cam rollers, each crossbar having on its outer diameter at least one spring element which in its initial state extends essentially in a plane containing the cage axis and which is bent essentially radially inwardly when the cam roller is inserted in the respective pocket.

2. A cage of claim 1 wherein the spring elements extend only over a part of the crossbar length.

3. A cage of claim 1 wherein the spring elements emanate from an outer edge of the crossbars adjacent to the pocket in which the spring element is active.

4. A cage of claim 3 wherein the surface of the lateral to and facing the pocket in which the spring element is active has a recess over its entire radially outer area.

5. A cage of claim 3 wherein the surface of the crossbar adjacent to the spring element has a groove in the area of the spring element and extending axially.

6. A cage of claim 1 wherein the spring element in the area in contact with the inserted cam rollers has an axial recess of circular arc shape adapted to the cam roller radius.

* * * * *